March 17, 1970  G. F. BINNINGS  3,501,057
LIQUID DISPENSER
Filed July 17, 1968
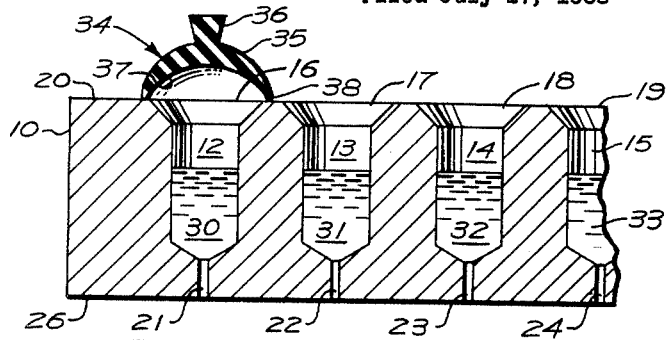
FIG. 1 - PRIOR ART
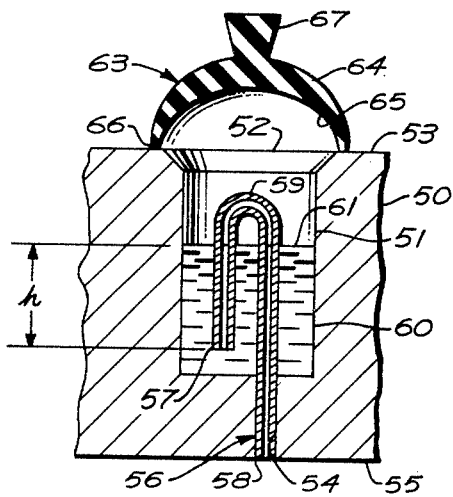
FIG. 2
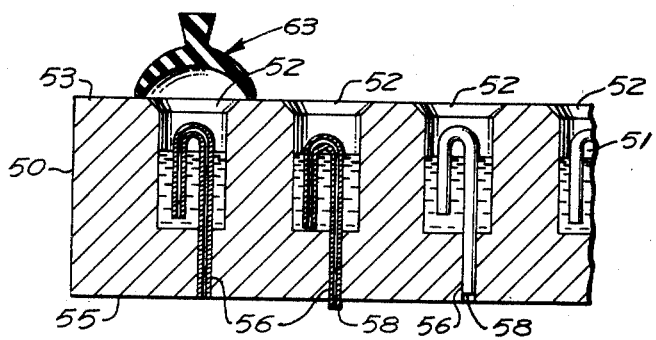
FIG. 3
INVENTOR.
GERALD F. BINNINGS
BY
J. Gordon Angus
ATTORNEY United States Patent Office 3,501,057
Patented Mar. 17, 1970

3,501,057
LIQUID DISPENSER
Gerald F. Binnings, Arcadia, Calif., assignor to Aerojet-General Corporation, El Monte, Calif., a corporation of Ohio
Filed July 17, 1968, Ser. No. 745,456
Int. Cl. B67d 5/06, 5/60
U.S. Cl. 222—132                                      1 Claim

ABSTRACT OF THE DISCLOSURE

This disclosure relates to liquid dispensers, and particularly to liquid dispensers for dispensing liquid such as blood serum.

A liquid dispenser according to the present disclosure comprises a housing having a cavity. A cavity opening is formed in the upper surface of the housing, and a bore is provided between the cavity and a lower surface of the housing. A siphon tube is supported within the bore in such a manner that its upper end opens into the cavity and its lower end opens into the region below the housing. Means is provided for increasing the fluid pressure within the cavity so as to force liquid in the cavity through the siphon tube.

---

This invention relates to fluid dispensers, and particularly to fluid dispeners capable of dispensing measured quantities of fluid. The invention is particularly useful for dispensing blood serum and the like.

Heretofore, dispensers for dispensing measured quantities of liquid, such as blood serum, comprised a housing having a plurality of cavities. A capillary tube was formed in the housing between each cavity and the upper surface of the housing. Ordinarily, the capillary tube had a small enough diameter so that liquid did not leak from the cavity. A measured quantity of liquid was contained in the cavity. When it was desirable to dispense the liquid in the cavity, the pressure above the liquid was increased by means of a pressure cap to thereby force the liquid through the capillary tube.

One problem associated with such prior art dispensers was that the capillary tube was often subject to leakage. Particularly, when the dispenser was moved, the capillary forces holding the fluid in the capillary tube were often exceeded by the momentum of the fluid, thereby causing leakage. Also, since the viscosity of the blood serum varies from sample to sample, lower viscosity serums tended to leak from the capillary tubes more readily than higher viscosity serums.

Another problem associated with prior dispensers was that the capillary tube tended to become clogged with dried or solidified blood serum, thereby preventing discharge of serum through the capillary tube. Blood serum in the capillary tube and cavity tended to dry and solidify or coagulate when exposed to air, thereby clogging the capillary tube and preventing discharge of fluid therethrough, and rendering the dispenser difficult to clean.

It is an object of the present invention to provide a fluid dispenser capable of dispensing predetermined quantities of fluid, which dispenser is not subject to leakage.

Another object of the present invention is to provide a fluid dispenser for dispensing measured quantities of fluid wherein the quantity to be dispensed may be selectively adjusted.

Another object of the present invention is to provide a fluid dispenser for dispensing fluids, such as blood serum, which may tend to solidify or coagulate in the presence of air, which dispenser has discharge openings arranged to substantially prevent clogging of the discharge opening by solidified and coagulated fluid.

Another object of the present invention is to provide a fluid dispenser having a removable dispensing tube.

A fluid dispenser according to the present invention comprises a housing having a cavity and a siphon tube disposed between the cavity and the bottom of the housing. Means is provided for increasing fluid pressure within the cavity so as to force liquid contained within the cavity through the siphon tube and from the housing.

According to a desirable but optional feature of the present invention, the siphon tube is slidably mounted within a bore so that the height of the upper end of the siphon tube may be selectively adjusted within the cavity and the quantity of fluid to be dispensed may be selectively adjusted.

According to another desirable but optional feature of the present invention, the siphon tube may be removed and replaced so that when a siphon tube becomes soiled, it may be removed and discarded and a new sterile siphon tube may be placed in its stead.

The above and other features of this invention will be more fully understood from the following detailed description and the accompanying drawings, in which:

FIG. 1 is a side view elevation in cutaway cross-section of a prior art fluid dispenser;

FIG. 2 is a side view elevation in cutaway cross-section of one chamber of a fluid dispenser in accordance with the presently preferred embodiment of the present invention; and FIG. 3 is a fragmentary side view in cutaway cross-section of a fluid dispenser according to the presently preferred embodiment of the present invention.

FIG. 1 illustrates dispensing apparatus heretofore used for dispensing measured quantities of blood serum onto microscope slides or for other laboratory purposes. Such apparatus comprised a housing 10 having a plurality of cavities 12, 13, 14, 15, each having a cavity opening 16, 17, 18, 19 in the upper surface 20 of housing 10. Capillary tubes 21, 22, 23, 24 provided fluid communication between cavities 12–15, respectively, and lower surface 26 of housing 10. The diameter of each of tubes 21–24 was such as to create capillary forces on the fluid to thereby prevent the fluid from being dispensed from the cavities.

Fluid 30–33 was admitted into each cavity 12–15 through cavity openings 16–19, respectively. When it was desired to dispense fluid from a particular cavity, dispenser cap 34 was placed over the particular cavity opening associated with the cavity from which liquid was to be dispensed, and cap 34 was pressed to force liquid through the capillary tube.

Dispenser cap 34 comprised a resilient body 35 having a handle or knob 36 integral therewith. Body 35 formed an interior cavity 37 which sealed by means of lip 38 against surface 20. An operator, desiring to dispense the liquid 30 from cavity 12, would place cap 34 over opening 16 of the cavity and thereafter press against knob 36. The pressure against knob 36 caused deformation of body 35 of the cap thereby causing the body to displace air above the liquid in the cavity. The displacement of air increased the pressure upon the surface of liquid 30 to thereby displace the liquid, thereby causing the liquid to be discharged through capillary tube 21 and past surface 26.

One problem associated with the dispenser illustrated in FIG. 1 was that the liquid tended to leak through the capillary tubes. Leakage of the fluid was undesirable and often altered the volume of fluid remaining to be dispensed. Also, where the liquid being dispensed was blood serum, the blood serum tended to solidify or coagulate within the capillary tubes, thereby clogging the capillary tubes and rendering it difficult to dispense the fluid. Anher problem associated with the dispenser illustrated in FIG. 1 was, due to the relatively small diameter of the capillary tubes, the capillary tubes were difficult to clean or sterilize.

A dispenser according to the present invention is illustrated in greater detail in FIGS. 2 and 3. In FIGS. 2 and 3 there is illustrated a housing 50 having a plurality of cavities 51 disposed therein. Openings 52 provide access between upper surface 53 of housing 50 and each cavity 51. Bore 54 is provided between lower surface 55 and each cavity 51.

Siphon tube 56 is disposed within each cavity 51 and supported by bore 54 in such a manner that upper end 57 is located near the lower portion of the cavity, lower end 58 is open to the region below lower surface 55 of the housing, and center loop portion 59 is disposed within the cavity above both of the ends. Liquid 60 is placed within cavity 51 to a liquid level 61, within the cavity and below loop 59 but above end 57 of siphon tube 56. Dispenser cap 63, which is similar to the dispenser cap 34 illustrated in FIG. 1, comprises resilient body 64 forming a cavity 65 therein. Lip 66 is adapted to abut and seal against surface 53 of housing 50. Rigid knob or handle 67 is integral with body 64.

In operation of the dispenser illustrated in FIGS. 2 and 3, liquid 60 is placed within cavity 51 through cavity opening 52. A sufficient quantity of liquid is placed within the cavity so as to raise the liquid level 61 to a height, h, above the upper end 57 of siphon tube 56 but below loop 59. Dispenser cap 63 is placed over cavity opening 52 so that lip 66 seals against surface 53 of the housing. Pressure is then applied to knob 67 to deform body 64 thereby increasing the pressure within cavity 51 in the housing. Increased pressure within the cavity forces serum through end 57 and up through the short leg of siphon tube 56 until the liquid has reached the elevation of the upper portion 59 of the siphon tube. The liquid then flows through the long leg of siphon tube 56 and is discharged through the lower end 58. Pressure cap 63 may be removed while the liquid is flowing so that the liquid siphons from the cavity. Alternatively, pressure may be applied by means of the pressure cap if so desired. Since the retention of fluid in cavity 51 is affectuated by means of an exit opening having a loop portion 59 above the liquid level, and not a capillary force as heretofore used, the diameter of siphon tube 56 may be any suitable diameter and may be larger than the capillary tubes heretofore used.

The amount of liquid dispensed from cavity 51 is dependent upon the height, h, of the liquid level above the upper end 57 of the siphon tube and the cross-sectional area of cavity 51. By adjusting the height of siphon tube 56, the amount of liquid to be dispensed may be varied. Thus, as illustrated particularly in FIG. 3, the siphon tube is slidably mounted within bore 54 so that the height of the siphon tube, and therefore the height of upper end 57, may be varied as desired. Thus, the siphon tube may be lowered so that more fluid may be dispensed, or may be raised within bore 54 so that less fluid would be dispensed.

Another feature of the present invention resides in the fact that the siphon tube may be removed through the cavity and discarded after usage so that a new, sterilized siphon tube may be inserted in bore 54. Siphon tube 56 and housing 50 are constructed of suitable material as to provide a fluid seal between them.

The present invention thus provides a fluid dispenser for dispensing measured quantities of fluid. The dispenser is positive in operation and easily used. A dispenser according to the present invention resists spillage and leakage, and clogging of the siphon tube is minimized because the siphon tube may have a greater diameter than the capillary tube heretofore used.

This invention is not to be limited by the embodiment shown in the drawings and described in the description, which is given by way of example and not of limitation.

What is claimed:
1. A liquid dispenser comprising: a housing; a plurality of cavities in said housing; a plurality of openings in an upper surface of said housing each providing fluid communication to individual ones of said cavities; a plurality of bores in said housing, each bore extending between a lower surface of said housing and an individual one of said cavities; a plurality of rigid siphon tubes each having an upper end open to individual ones of said cavities, a lower end open to the region below said cavity, and a loop portion within the respective cavity above both of said ends, each of said siphon tubes being slidably mounted in a respective bore; and a resilient cap adapted to be positioned against the upper surface of said housing and encompassing individual ones of said openings, whereby pressure applied to said cap deforms the cap to increase pressure in the cavity thereby dispensing fluid contained in the cavity through said siphon tube to the region below said housing.

References Cited

UNITED STATES PATENTS

| | | | |
|---|---|---|---|
| 343,764 | 6/1886 | Gaska | 222—204 |
| 932,939 | 8/1909 | De Alba | 137—145 X |
| 1,622,832 | 3/1927 | Lambert | 137—145 |
| 1,661,202 | 3/1928 | Thayer | 137—152 |
| 2,109,781 | 3/1938 | Nealon | 137—145 |
| 2,328,005 | 8/1943 | Green | 222—204 |
| 3,391,830 | 7/1968 | Kitchens | 222—416 X |

SAMUEL F. COLEMAN, Primary Examiner

H. S. LANE, Assistant Examiner

U.S. Cl. X.R.
222—136, 204